United States Patent
Yuan et al.

(10) Patent No.: US 11,526,427 B2
(45) Date of Patent: Dec. 13, 2022

(54) SOFTWARE CODE TESTING SYSTEM

(71) Applicant: Dell Products L.P., Round Rock, TX (US)

(72) Inventors: Fei Yuan, Chengdu (CN); Jie Wang, Chengdu (CN); Bowen Lei, Chengdu (CN); Fei Wang, Chengdu (CN); Qinglan Li, Chengdu (CN)

(73) Assignee: Dell Products L.P., Round Rock, TX (US)

(*) Notice: Subject to any disclaimer, the term of this patent is extended or adjusted under 35 U.S.C. 154(b) by 79 days.

(21) Appl. No.: 16/946,700

(22) Filed: Jul. 1, 2020

(65) Prior Publication Data
US 2021/0232491 A1  Jul. 29, 2021

(30) Foreign Application Priority Data
Jan. 23, 2020 (CN) .......................... 202010076335.7

(51) Int. Cl.
*G06F 9/44* (2018.01)
*G06F 11/36* (2006.01)

(52) U.S. Cl.
CPC ...... *G06F 11/3676* (2013.01); *G06F 11/3684* (2013.01); *G06F 11/3688* (2013.01); *G06F 11/3692* (2013.01)

(58) Field of Classification Search
CPC ............. G06F 11/3676; G06F 11/3684; G06F 11/3688; G06F 11/3692
See application file for complete search history.

(56) References Cited

U.S. PATENT DOCUMENTS

| | | | | |
|---|---|---|---|---|
| 2003/0212661 A1* | 11/2003 | Avvari | ................ | G06F 11/3676 |
| 2009/0265693 A1* | 10/2009 | Bakowski | ........... | G06F 11/3688 717/131 |
| 2015/0007140 A1* | 1/2015 | Boshernitsan | ...... | G06F 11/3688 717/124 |
| 2015/0309918 A1* | 10/2015 | Raghavan | ........... | G06F 11/3688 714/38.1 |
| 2019/0018761 A1* | 1/2019 | Ramraz | ................ | G06F 11/3676 |
| 2019/0354467 A1* | 11/2019 | Wiener | ............... | G06F 11/3688 |
| 2019/0377666 A1* | 12/2019 | Klein | ................... | G06F 11/3692 |

* cited by examiner

*Primary Examiner* — Chat C Do
*Assistant Examiner* — Lenin Paulino
(74) *Attorney, Agent, or Firm* — Joseph Mencher

(57) ABSTRACT

A software code testing system includes sub-engines and a test case database storing test cases. A test case sub-engine runs each of the test cases on a plurality of software code modules, and a software code coverage determination sub-engine identifies a respective software code coverage for each software code method included in each of the software code modules. A test case/software code coverage mapping sub-engine then maps the respective software code coverage for each of the software code methods included in each of the software code modules with the respective test case that was run on that software code module to provide a test case/software code coverage mapping, which is used by a test suite optimization sub-engine to generate a test suite that includes a subset of the test cases that provide a desired level of software code coverage using a minimum number of test cases.

20 Claims, 6 Drawing Sheets

SOFTWARE CODE TESTING SYSTEM

CROSS-REFERENCE TO RELATED APPLICATIONS

This application claims priority to Chinese Patent Application Serial No. 202010076335.7, filed Jan. 23, 2020, the disclosure of which is incorporated herein by reference in its entirety.

BACKGROUND

The present disclosure relates generally to information handling systems, and more particularly to testing software code that is implemented on information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes utilized to test software code implemented on other information handling systems provided by, for example, server devices and/or other computing devices. For example, it is desirable to periodically test completed software products that are integrated into such computing devices, and the testing of the software code that provides those software products is conducted by performing a series of tests that attempt to "exercise" or run as much of that software code that will be implemented on the computing devices as possible. "Test cases" that operate to run the software code during testing may be built around the specifications, requirements, and design of the different software code modules or functionality performed by the software product based on, for example, external descriptions of the software product. However, the "coverage" of the software code being tested (e.g., the portion of the software code in the software product that is actually tested using the test cases) in such conventional software code testing systems often relies on the experience of the user performing the testing. As such, the actual software code coverage from conventional software code testing of a software product is unknown, and the user performing the tests will often simply just run all available test cases in an attempt to maximize that software code coverage. Furthermore, users performing testing often judge whether software code testing is sufficient for particular software code based on the functionality specification of the software code and the user's experience (and without considering the internal logical structure of the software code), and when software code functionality changes those users often retest the entire software code with all of the test cases, which can cause a relatively high number of invalid test executions and can waste testing resources. As such, software code testing can be inefficient, with multiple test cases exercising or running the same software code in an attempt to maximize software code coverage, or a set of limited test cases failing to exercise or run portions of the software code in exchange for a quicker software code testing process.

Accordingly, it would be desirable to provide a software code testing system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a software code testing engine that is configured to: run each of a plurality of test cases on a plurality of software code modules; identify, based on the running of each of the plurality of test cases on the plurality of software code modules, a respective software code coverage for each at least one software code method included in each of the plurality of software code modules; map the respective software code coverage for each of the at least one software code method included in each of the plurality of software code modules with the respective test case that was run on that software code module to provide a test case/software code coverage mapping; and generate, using the test case/software code coverage mapping, a test suite that includes a subset of the plurality of test cases that provide a desired level of software code coverage of the software code methods included in the plurality of software code modules using a minimum number of the plurality of test cases.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
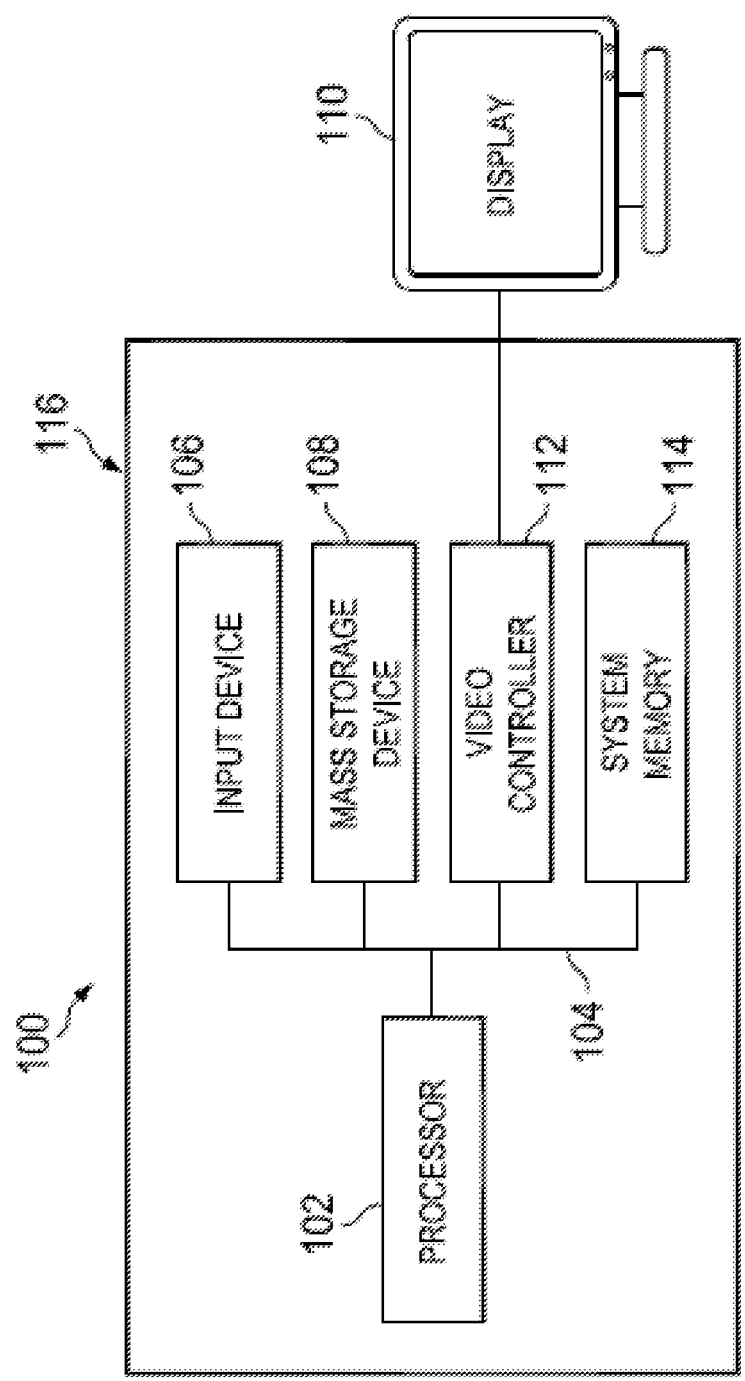
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
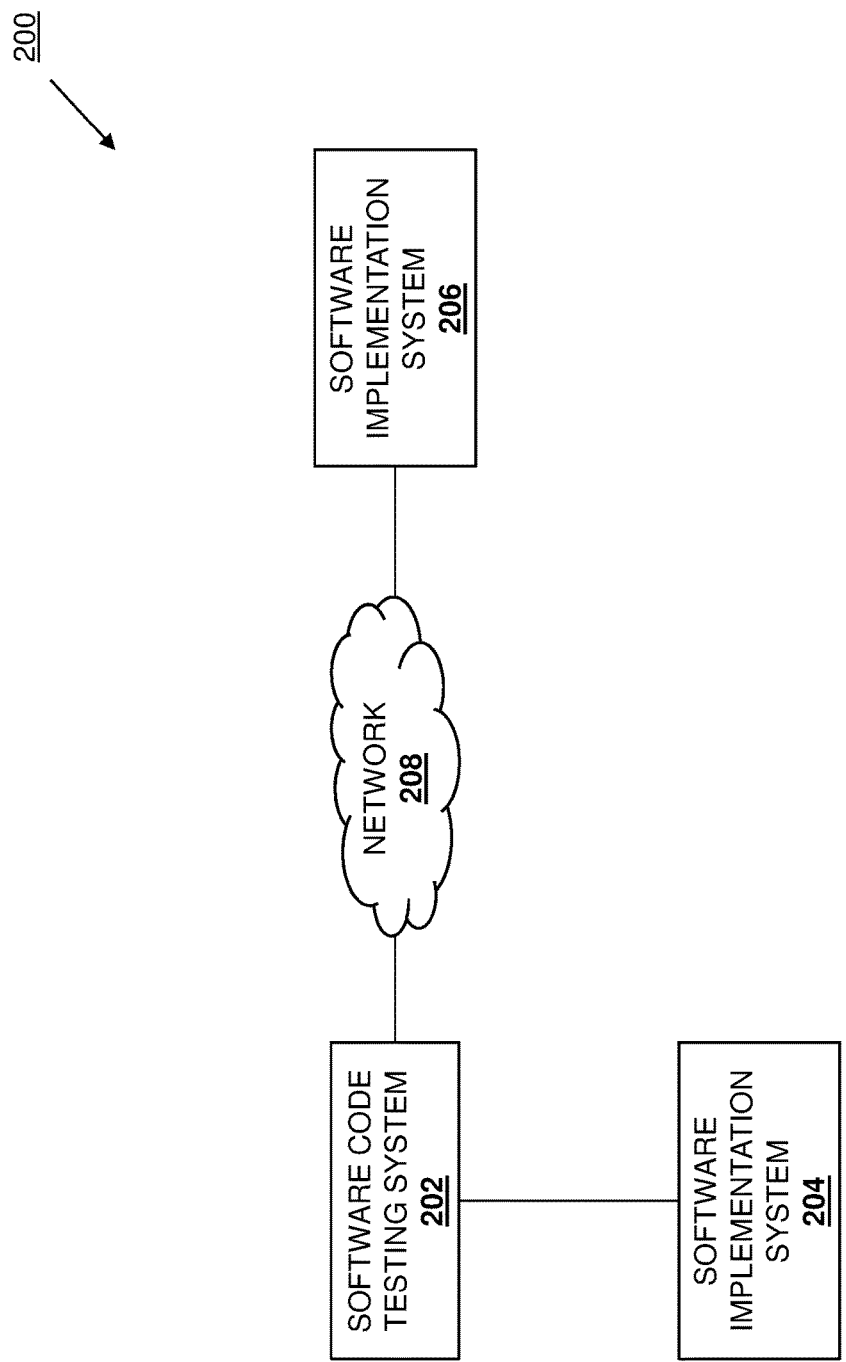
FIG. 2 is a schematic view illustrating an embodiment of a software code testing network.

Referring now to FIG. 2, an embodiment of a software code testing network 200 is illustrated. In the illustrated embodiment, the software code testing network 200 incudes a software code testing system 202. In an embodiment, the software code testing system 202 may be provided by the IHS 100 discussed above with reference to FIG. 1, and/or may include some or all of the components of the IHS 100, and in specific examples may be provided by one or more server devices. However, while illustrated and discussed as a being provided by one or more server devices, one of skill in the art in possession of the present disclosure will recognize that software code testing systems provided in the software code testing network 200 may include any devices or systems that may be configured to operate similarly as the software code testing system 202 discussed below.

In the illustrated embodiment, the software code testing system 202 is locally coupled to a software implementation system 204, and coupled to a software implementation system 206 via a network 208 such as a Local Area Network (LAN), the Internet, combinations thereof, and/or other networks that would be apparent to one of skill in the art in possession of the present disclosure. In an embodiment, the software implementation systems 204 and 206 may be provided by the IHS 100 discussed above with reference to FIG. 1, and/or may include some or all of the components of the IHS 100, and in specific examples may be provided by one or more server devices. However, while illustrated and discussed as a being provided by one or more server devices, one of skill in the art in possession of the present disclosure will recognize that software implementation systems provided in the software code testing network 200 may include any devices or systems that may be configured to operate similarly as the software implementation systems 206 and 208 discussed below. One of skill in the art in possession of the present disclosure will appreciate that the embodiment of the software code testing network 200 illustrated in FIG. 2 provides an example of how the software code testing system 202 may identify software code for testing that is implemented on a local system or a network-connected system, and one of skill in the art in possession of the present disclosure will appreciate that the software code testing network 200 (or the software code testing system 202) may include a variety of devices for receiving and preparing such software code for testing in the manners described below while remaining within the scope of the present disclosure. Furthermore, while a specific software code testing network 200 has been illustrated and described, one of skill in the art in possession of the present disclosure will recognize that the software code testing system of the present disclosure may include a variety of components and component configurations while remaining within the scope of the present disclosure as well.

Figure 3:
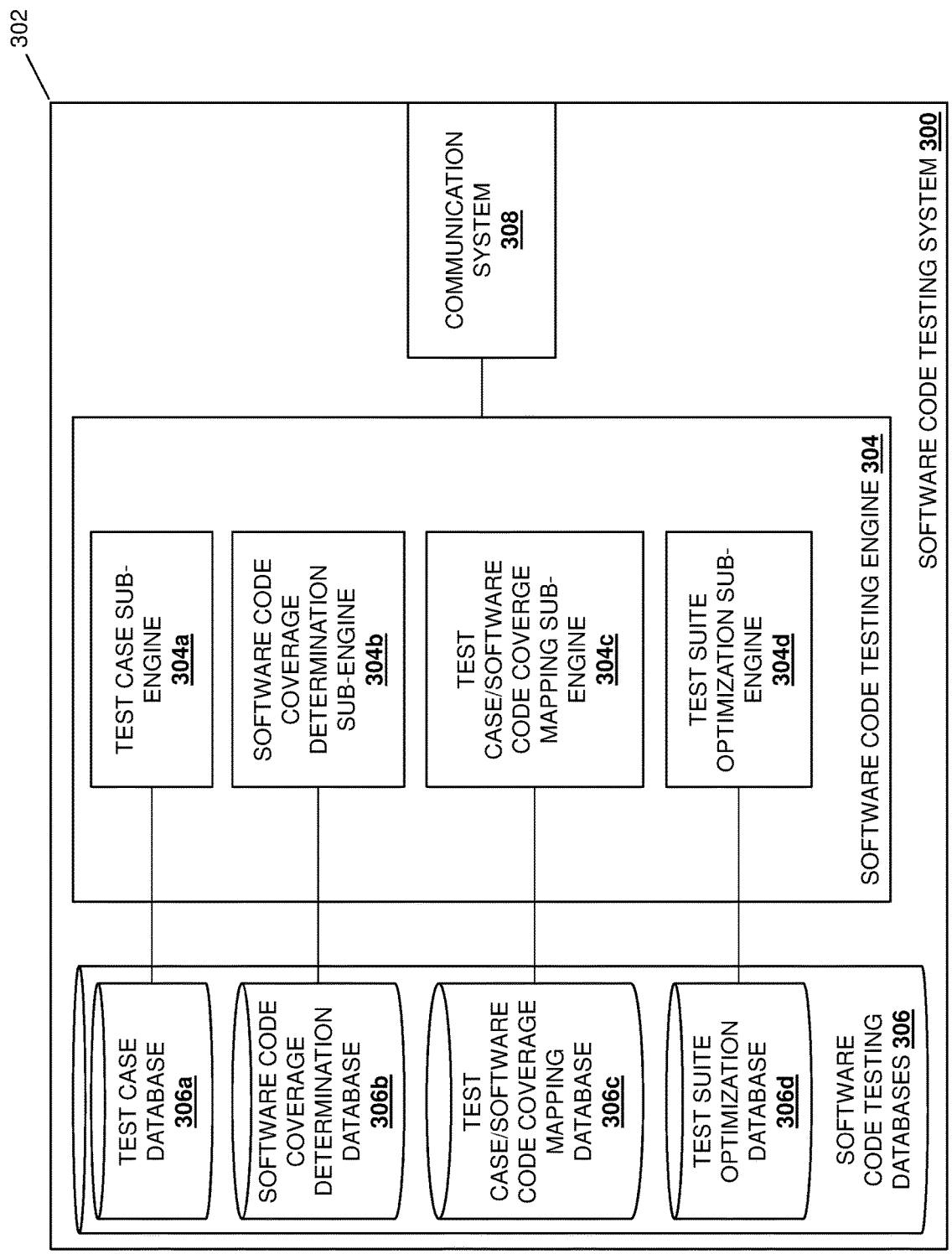
FIG. 3 is a schematic view illustrating an embodiment of a software code testing system that may be provided in the software code testing network of FIG. 2.

Referring now to FIG. 3, an embodiment of a software code testing system 300 is illustrated that may provide the software code testing system 202 discussed above with reference to FIG. 2. As such, the software code testing system 300 may be provided by the IHS 100 discussed above with reference to FIG. 1 and/or may include some or all of the components of the IHS 100, and in specific examples may be provided by one or more server devices. Furthermore, while illustrated and discussed as being provided by one or more server devices, one of skill in the art in possession of the present disclosure will recognize that the functionality of the software code testing system 300 discussed below may be provided by other devices that are configured to operate similarly as the software code testing system 300 discussed below. In the illustrated embodiment, the software code testing system 300 includes a chassis 302 that houses the components of the software code testing system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a software code testing engine 304 that is configured to perform the functionality of the software code testing engines and/or software code testing systems discussed below.

The chassis 302 may also house a storage system (not illustrated, but which may include the storage 108 discussed above with reference to FIG. 1) that is coupled to the software code testing engine 304 (e.g., via a coupling between the storage system and the processing system) and that includes software code testing databases 306 that are configured to store any of the information utilized by the software code testing engine 304 discussed below. The chassis 302 may also house a communication system 308 that is coupled to the software code testing engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

In the specific example illustrated in FIG. 3, the software code testing engine 304 includes a plurality of sub-engines that are coupled to respective databases included in the software code testing database 306, and that operate to perform different functionality provided by the software code testing engine 304. For example, a test case sub-engine 304a in the software code testing engine 304 may be coupled to a test case database 306a in the software code testing databases 306 and configured to perform the test case functionality described below, a software code coverage determination sub-engine 304b in the software code testing engine 304 may be coupled to a software code coverage determination database 306b in the software code testing databases 306 and configured to perform the software code coverage determination functionality described below, a test case/software code coverage mapping sub-engine 304c in the software code testing engine 304 may be coupled to a test case/software code coverage mapping database 306c in the software code testing databases 306 and configured to perform the software code coverage determination functionality described below, and a test suite optimization sub-engine 304d in the software code testing engine 304 may be coupled to a test suite optimization database 306d in the software code testing databases 306 and configured to perform the test suite optimization functionality described below. However, while a specific software code testing system 300 has been illustrated, one of skill in the art in possession of the present disclosure will recognize that specific software code testing systems (or other devices operating according to the teachings of the present disclosure in a manner similar to that described below for the specific software code testing system) may include a variety of components and/or component configurations for providing conventional specific software code testing system functionality, as well as the functionality discussed below, while remaining within the scope of the present disclosure as well.

Figure 4:
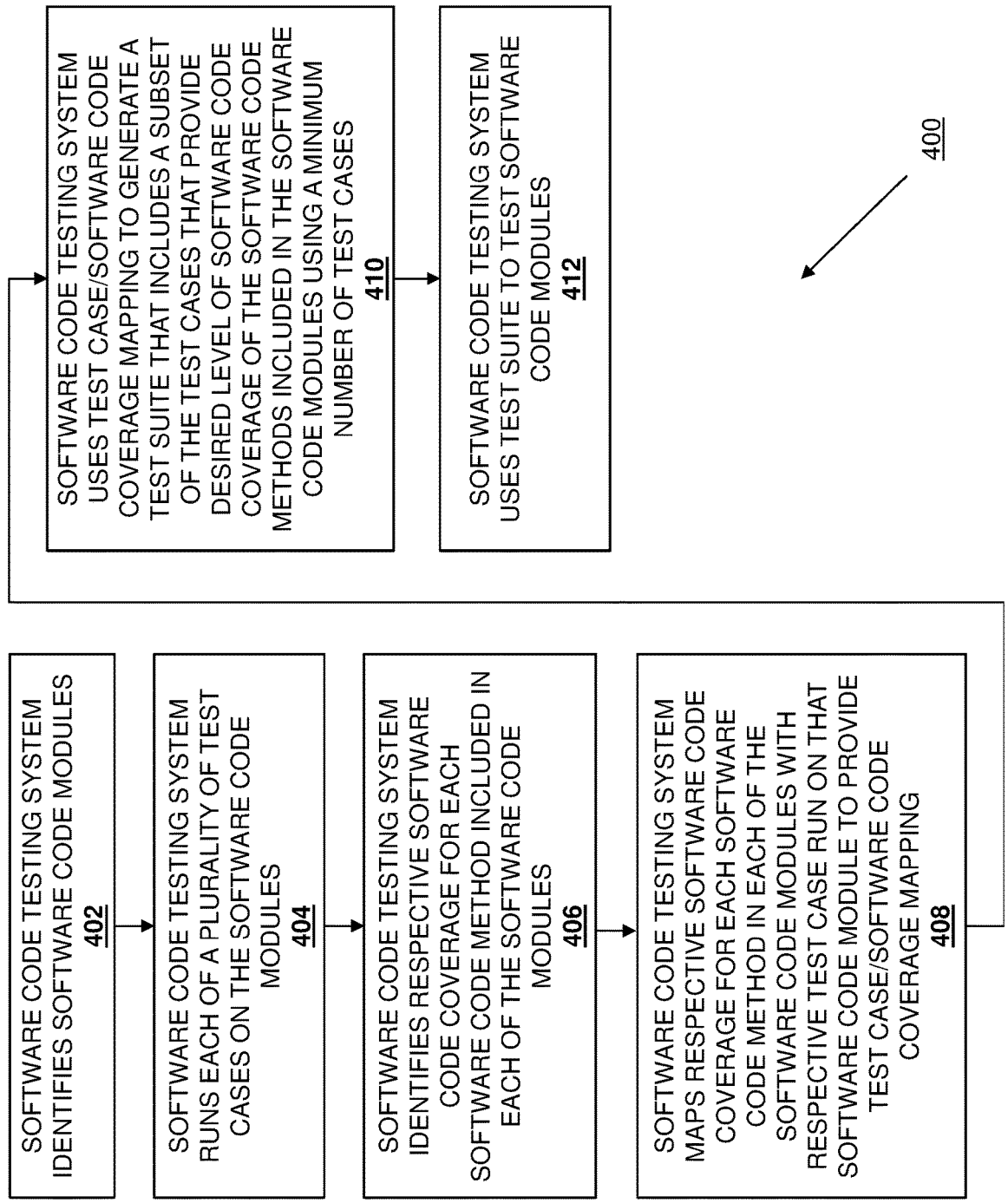
FIG. 4 is a flow chart illustrating an embodiment of a method for testing software code.

Referring now to FIG. 4, an embodiment of a method 400 for testing software code is illustrated. As discussed below, the systems and methods of the present disclosure provide for software code testing in which a test suite of test cases may be identified for testing software code that includes a minimum number of available test cases that provide a desired level (e.g., a maximum level) of software code coverage for that software code. For example, a plurality of test cases may be available for testing particular software code that includes a plurality of software code modules, and each of those test cases may be run on the plurality of software code modules. In response to running each of the test cases on the plurality of software code modules, respective software code coverage for each software code method in each of the software code modules may be identified and mapped with the respective test case that was run on that software code module in order to provide a test case/software code coverage mapping. The test case/software code coverage mapping is then used to generate a test suite that includes a subset of the plurality of test cases that provide a desired level of software code coverage of the software code methods included in the software code modules using a minimum number of test cases, and that test suite may be utilized for subsequent testing of that particular software code. As such, more efficient software code testing is provided that may result in maximum software code coverage using a minimum number of test cases to test that software code.

The method 400 begins at block 402 where a software code testing system identifies software code modules. In an embodiment, at block 402 and as discussed above, the software code testing system of the present disclosure may identify software code that will be implemented on a software implementation system that may be local or connected via a network. As such, with reference to FIG. 2, the software code testing system 202 may identify software code modules in software code that is implemented on the software implementation system 204 that is locally coupled to the software code testing system 202, and/or may identify software code modules in software code that is implemented on the software implementation system 206 that is coupled to the software code testing system 202 via the network 208. As will be appreciated by one of skill in the art in possession of the present disclosure, in the embodiments discussed below, at block 402 the software code (e.g., source code) being tested by the software code testing system 202 may be provided by the software implementation systems 204 and/or 206 to the software code testing system 202 for testing (e.g., that software code may be run on the software code testing system 202 during testing in the manner described below.) However, in other embodiments, the software code testing system 202 may test the software code (e.g., source code) on the software implementation systems 204 and/or 206 (e.g., that software code may be run on the software implementation systems 204 and/or 206 during testing in the manner described below) during the method 400. Furthermore, while a few specific examples have been provided, one of skill in the art in possession of the present disclosure will appreciate that the software code testing of the present disclosure may be performed in a variety of manners that will fall within the scope of the present disclosure as well.

In the examples provided below, the software code being tested includes a plurality of software code modules that each provide different functionality for that software code, with each of the software code modules including one or more software code methods that enable the functionality provided by their software code module. For example, software code being tested may include software code that provides a website, with a first software code module for that software code providing user login functionality that allows a user to login to the website, a second software code module for that software code providing for the opening of a webpage for the website in an Internet browser application, and so on. As will be appreciated by one of skill in the art in possession of the present disclosure, the first software code methods for the first software code module may include any software code methods that, when combined, provide the user login functionality discussed above. Similarly, the second software code methods for the second software code module may include any software code methods that, when combined, provide the webpage opening functionality discussed above. However, while particular nomenclature and software code structure is utilized in the examples provided below, one of skill in the art in possession of the present disclosure will appreciate that the teachings of the present disclosure may be applied to a variety of software code associated with different nomenclatures and structures while remaining within the scope of the present disclosure as well.

In an embodiment, at block 402 and subsequent to identifying the software code modules, the software code testing engine 304 may operate to "inject" or otherwise provide at least one software code coverage hook element into each of the plurality of software code modules identified at block 402. For example, at block 402, the software code coverage determination sub-engine 304b may operate to inject a respective software code coverage hook element for each software code method that is included in each software code module that was identified at block 402. In a specific example, the software code coverage determination sub-engine 304b may operate to add software code coverage hook elements for each software code method that is included in each software code module in the software code that is to-be tested, then provide that software code to a software code compiling subsystem and software code linker subsystem to convert that software code (with software code coverage hook elements) to executable object files. The following pseudo code provides an example of how software code coverage hook elements may be injected/added/provided for software code:

```
//method quantity
int len = 100
int n = 0;
bool cov_tag [len];
//tag whether the method is covered or not
cov_tag[n] = true;
int method_0(...){...}
...
n++
//tag whether the method is covered or not
cov_tag[n] = true;
int method_1(...){...}
...
n++
//tag whether the method is covered or not
cov_tag[n] = true;
int method_n(...){...}
...
int cov_sum( ) //call on program exit
{
    ...
    string method_name[n] = get_name(n);
    hash_map<int,bool> cov_map;
    for(int a =0; a < cov_map.length( ); a = a+1)
    {
        m_name _ method_name[a]
        cov_map[m_name] = cov_tag[a];
        ...
    }
}
//export method coverage data
int export_cov( )
{
    ...
}
...
```

However, while specific examples are provided, one of skill in the art in possession of the present disclosure will recognize that the software code coverage hook elements provided in the software code modules in the software code may be configured to identify the respective software code coverage for each at least one software code method included in each of those software code modules in a variety of manners that will fall within the scope of the present disclosure as well.

The method 400 then proceeds to block 404 where the software code testing system runs each of a plurality of test cases on the software code modules. In an embodiment, at block 404, the software code testing system 202 may operate to run each of a plurality of test cases available for the software code being tested on the software code modules identified at block 402. For example, with reference to the example of the software code testing system 300 in FIG. 3, the test case database 306a in the software code testing databases 306 may include a plurality of test cases that have been configured to test the software code modules identified at block 402. As will be appreciated by one of skill in the art in possession of the present disclosure, the plurality of test cases in the test case database 306a may include "existing" test cases that have been previously utilized on other software code (e.g., a test case that was previously configured to test user login functionality and well other functionality as discussed below), "new" test cases that were created to test one or more of the software code modules received at block 402 (e.g., a test case that was created/configured to test webpage opening functionality and well other functionality as discussed below), and/or any other test cases that would be apparent to one of skill in the art in possession of the present disclosure.

Figure 5:
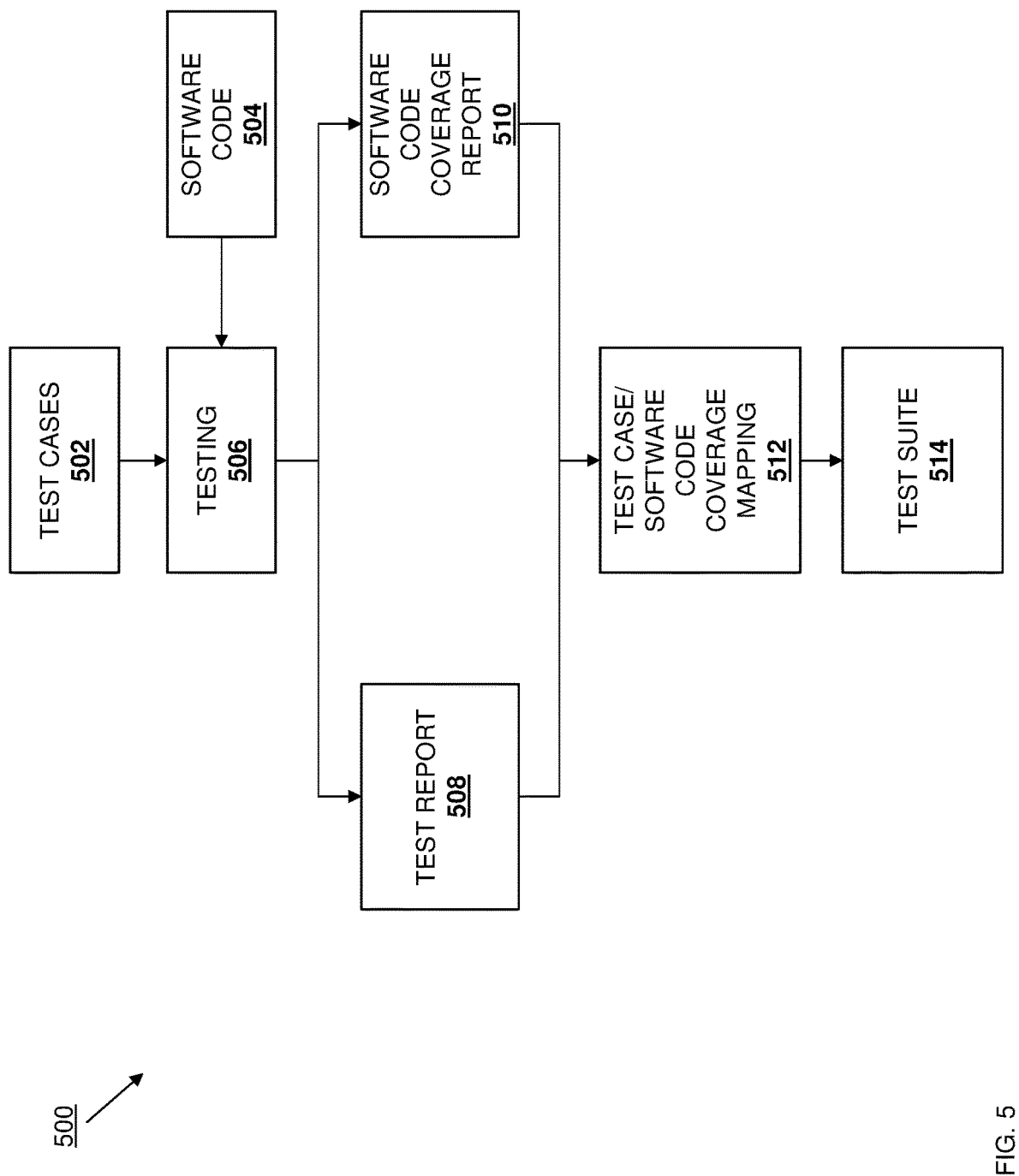
FIG. 5 is a schematic view illustrating an embodiment of the testing of software code by the software code testing system of FIG. 3 during the method of FIG. 4.

As such, at block 404, the test case sub-engine 304a may operate to run each of the plurality of test cases included in the test case database 306a on each of the software code modules received at block 402. Continuing with the example provided above, at block 404, the test case sub-engine 304a may run a first test case that may operate to "exercise" or test one or more of the software code methods included in a software code module received at block 402, a second test case that may operate to "exercise" or test one or more of the software code methods included in a software code module received at block 402, and so on. As discussed below, the running of any particular test case on one or more software code methods included in a software code module will operate to "exercise" or test those one or more software code methods and, in particular, different test cases may operate to "exercise" or test one or more of the same software code methods. As such, at block 404, the running of each of the plurality of test cases on the software code modules may be performed to ensure that a test case is run that "exercises" or tests at least some of the software code methods in each of the software code modules, with the understanding that not all of the software code methods in those software code modules may be "exercised" or tested, and that one or more software code methods in those software code modules may be "exercised" or tested more than once. With reference to FIG. 5, a software code testing flow 500 illustrates how a plurality of test cases 502 may be run on software code modules in software code 504 to perform testing 506.

As will be appreciated by one of skill in the art in possession of the present disclosure, following block 404, the test case sub-engine 304a may generate a test report that indicates the results of the running of each of the plurality of test cases on the each of the software code modules received at block 402. For example, as discussed above, each test case may be run to test one or more software code methods in a particular software code module, and the test report generated by the test case sub-engine 304a may identify the software code module that was tested, the test case that was run on that software code module to test it, the results of the testing (e.g., "pass" or "fail"), as well as any other test report information that would be apparent to one of skill in the art in possession of the present disclosure. However, while specific test result reporting has been described, one of skill in the art in possession of the present disclosure will recognize that test result reporting may be provided in a variety of manners that will fall within the scope of the present disclosure as well. With reference again to FIG. 5, the software code testing flow 500 illustrates how the testing 506 results in a test report 508.

The method 400 then proceeds to block 406 where the software code testing system identifies respective software code coverage for each software code method included in each of the software code modules. In an embodiment, at block 406, the software code testing engine 304 may operate to identify the respective software code coverage for each software code method that is included in the software code modules that were tested at block 404. For example, as discussed above, software code coverage hook elements may have been provided for each software code method in each software code module in the software code, and may be configured to identify the respective software code coverage of the testing of each of those software code methods in each of those software code modules. As such, the running of each of the test cases on the one or more software code methods in each of the software code modules at block 404 may result in the software code coverage hook elements reporting software code coverage data for each of those software code coverage hook elements to the software code coverage determination sub-engine 304b, and the software code coverage determination sub-engine 304b may then utilize that software code coverage data to generate a software code coverage report that identifies the respective software code coverage for each software code methods in each software code module at the conclusion of the testing using each of the test cases. With reference again to FIG. 5, the software code testing flow 500 illustrates how the testing 506 results in a software code coverage report 510.

In a specific example, a software code coverage report may identify a software code coverage for software code methods in a first software code module, a second software code module, and a third software code module as follows:

| FIRST SOFTWARE CODE MODULE | |
|---|---|
| SOFTWARE CODE METHOD IDENTIFIER | SOFTWARE CODE COVERAGE |
| CLASS 1 METHOD 1 | TRUE |
| CLASS 1 METHOD 2 | FALSE |
| . . . | . . . |
| CLASS 5 METHOD 1 | TRUE |
| CLASS 5 METHOD 2 | TRUE |
| . . . | . . . |
| CLASS M METHOD N | FALSE |

| SECOND SOFTWARE CODE MODULE | |
|---|---|
| SOFTWARE CODE METHOD IDENTIFIER | SOFTWARE CODE COVERAGE |
| CLASS 7 METHOD 1 | TRUE |
| CLASS 7 METHOD 2 | FALSE |
| . . . | . . . |
| CLASS 9 METHOD 1 | TRUE |
| CLASS 9 METHOD 2 | TRUE |
| . . . | . . . |
| CLASS M METHOD N | FALSE |

| THIRD SOFTWARE CODE MODULE | |
|---|---|
| SOFTWARE CODE METHOD IDENTIFIER | SOFTWARE CODE COVERAGE |
| CLASS 1 METHOD 1 | TRUE |
| CLASS 1 METHOD 2 | FALSE |
| . . . | . . . |
| CLASS 4 METHOD 1 | TRUE |
| CLASS 4 METHOD 2 | TRUE |
| . . . | . . . |
| CLASS M METHOD N | FALSE |

As will be appreciated by one of skill in the art in possession of the present disclosure, the software code coverage reports provided above identify each software code method in a particular software code module, as well as whether that software code method was "exercised", tested, or otherwise covered (e.g., "true" in the software code coverage column) or not (e.g., "false" in the software code coverage column) during the testing. However, while specific examples are provided, one of skill in the art in possession of the present disclosure will appreciate that software code coverage may be identified in a variety of manners that will fall within the scope of the present disclosure as well.

The method 400 then proceeds to block 408 where the software code testing system maps respective software code coverage for each software code method in each of the software code modules with the respective test case run on that software code module to provide a test case/software code coverage mapping. In an embodiment, at block 408, the software code testing engine 304 may operate at block 408 to generate a test case/software code coverage mapping that maps respective software code coverage for each software code method in each of the software code modules with the respective test case run on that software code module. For example, at block 408, the test case/software code coverage mapping sub-engine 304c may utilize the test report generated by the test case sub-engine 304a and the software code coverage report generated by the software code coverage determination sub-engine 304b in order to generate a test case/software code coverage mapping. With reference again to FIG. 5, the software code testing flow 500 illustrates how the test report 508 and the software code coverage report 510 may be utilized to generate a test case/software code coverage mapping 512.

For example, as discussed above, the test report generated by the test case sub-engine 304a may identify each software code module and the test case that was run on that software code module during testing (as well as the results of that testing), while the software code coverage report generated by the software code coverage determination sub-engine 304b may identify whether each software code method in each software code module was covered (e.g., "exercised" or tested) during the testing. As such, at block 408, the test case/software code coverage mapping sub-engine 304c may operate to map test cases identified in the test report with software code methods and their corresponding code coverage in the software code coverage report based on the software code module associated with each in both of the test report and the software code coverage report. In a specific example, the mapping performed by the test case/software code coverage mapping sub-engine 304c may generate the following test case/software code coverage mapping data:

| FIRST TEST CASE COVERAGE: 60% ||
|---|---|
| SOFTWARE CODE METHOD IDENTIFIER | SOFTWARE CODE COVERAGE |
| CLASS 1 METHOD 1 | TRUE |
| CLASS 1 METHOD 2 | FALSE |
| ... | ... |
| CLASS 5 METHOD 1 | TRUE |
| CLASS 5 METHOD 2 | TRUE |
| ... | ... |
| CLASS M METHOD N | FALSE |

| SECOND TEST CASE COVERAGE: 70% ||
|---|---|
| SOFTWARE CODE METHOD IDENTIFIER | SOFTWARE CODE COVERAGE |
| CLASS 1 METHOD 1 | FALSE |
| CLASS 1 METHOD 3 | FALSE |
| ... | ... |
| CLASS 5 METHOD 4 | TRUE |
| CLASS 5 METHOD 2 | TRUE |
| ... | ... |
| CLASS M METHOD N | FALSE |

| THIRD TEST CASE COVERAGE: 40% ||
|---|---|
| SOFTWARE CODE METHOD IDENTIFIER | SOFTWARE CODE COVERAGE |
| CLASS 1 METHOD 2 | FALSE |
| CLASS 1 METHOD 5 | FALSE |
| ... | ... |
| CLASS 5 METHOD 22 | FALSE |
| CLASS 5 METHOD 24 | TRUE |
| ... | ... |
| CLASS M METHOD N | FALSE |

As will be appreciated by one of skill in the art in possession of the present disclosure, the test case/software code coverage mapping data above identifies each test case, the software code coverage that test case provided for the software code methods included in the software code module it was provided to test, as well as each software code method in that software code module and whether that software code method was "exercised", tested, or otherwise covered (e.g., "true") or not ("false"). In a specific example of the blocks of the method 400 described above, a first set of test cases (e.g., 100 test cases) may be run on a particular software code module to test a first subset of the software code methods (e.g., 0.50 software code methods) included in that software code module, while a second set of test cases (e.g., 200 test cases) may be run on that software code module to test a second subset of the software code methods (e.g., 100 software code methods) included in that software code module, and the results of the running of the first and second subset of test cases will produce test results and code coverage results that may be mapped as described above to identify the code coverage of the software code methods that provide the functionality feature of that software code module.

Figure 6:
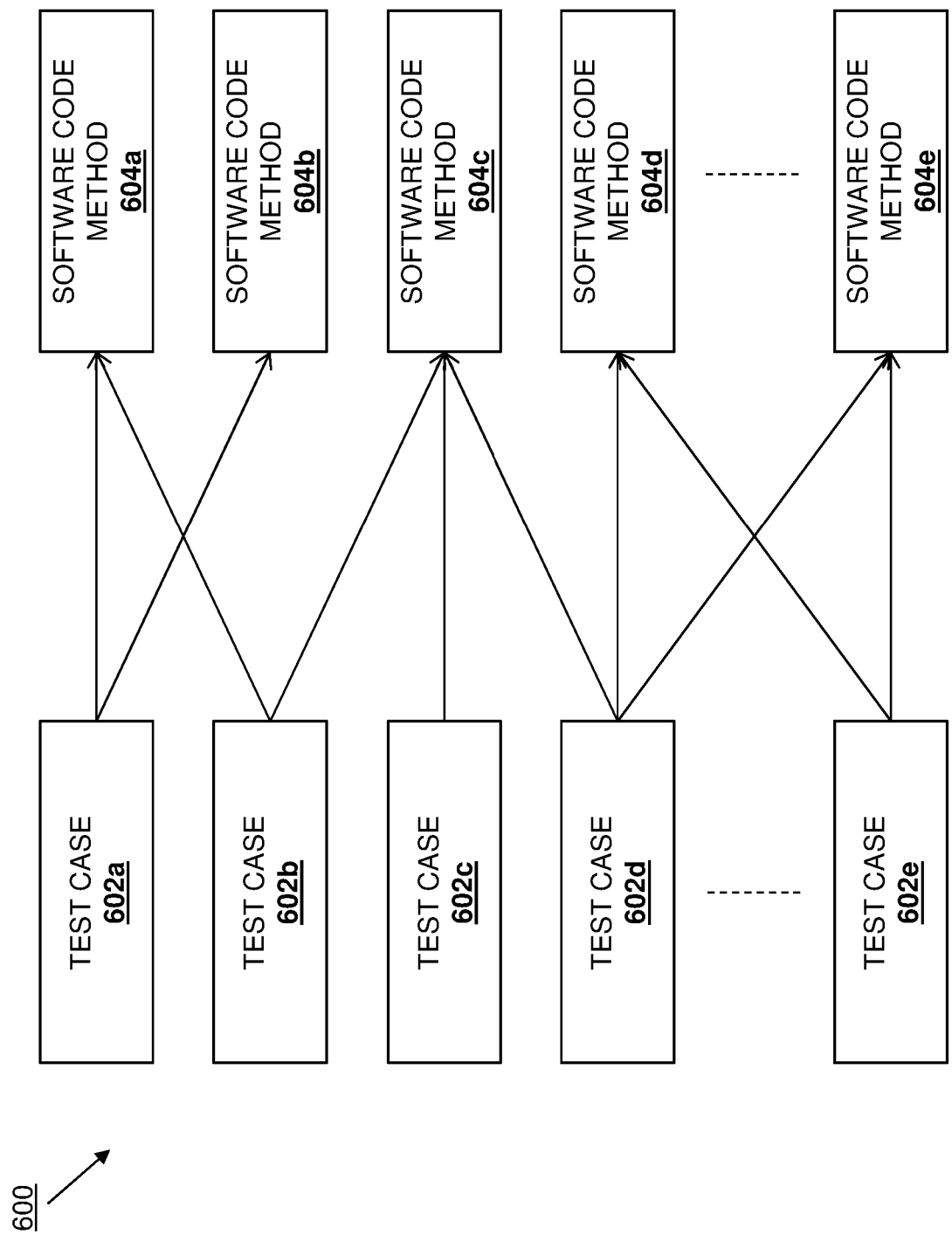
FIG. 6 is a schematic view illustrating an embodiment of the results of testing of software code by the software code testing system of FIG. 3 during the method of FIG. 4.

With reference to FIG. 6, a schematic view of the mapping data 600 is illustrated. As would be understood by one of skill in the art in possession of the present disclosure, the mapping data 600 illustrated in FIG. 6 illustrates how different test cases may operate to "exercise" or test different software code methods to provide software code coverage those software code methods, and thus may be mapped to those software code methods. FIG. 6 illustrates how a plurality of test cases 602a, 602b, 602c, 602d, and up to 602e may be mapped to a plurality of software code methods 604a, 604b, 604c, 604d, and 604e. In the illustrated example, the test case 602a is mapped to (and provides software code coverage for) the software code methods 604a and 604b, the test case 602b is mapped to (and provides software code coverage for) the software code methods 604a and 604c, the test case 602c is mapped to (and provides software code coverage for) the software code method 604c, the test case 602d is mapped to (and provides software code coverage for) the software code methods 604c, 604d, and 604e, and the test case 602e is mapped to (and provides software code coverage for) the software code methods 604d and 604e. As such, different test cases may provide software code coverage for the same software code methods, which as discussed below may allow one or more test cases that provide redundant software code coverage for software code methods to be removed from subsequent testing operations.

The method 400 then proceeds to block 410 where the software code testing system uses the test case/software code coverage mapping to generate a test suite that includes a subset of the test cases that provide a desired level of software code coverage of the software code methods included in the software code modules using the minimum number of test cases. In an embodiment, at block 410, the software code testing engine 304 may operate to utilize the test case/software code coverage mapping to generate a test suite that includes a subset of the test cases that provide a maximum level of software code coverage of the software code methods using the minimum number of test cases. For example, at block 410, the test suite optimization sub-engine 304d may analyze, process, and/or otherwise utilize the test case/software code coverage mapping to identify a minimum number of the test cases in the test case database 306a that will provide for the maximum amount of software code coverage for the software code modules (e.g., that provides for the "exercising" or testing of a maximum percentage of the software code methods included in the software code modules in the software code.)

In an embodiment, the utilization of the test case/software code coverage mapping to generate a test suite that includes a subset of the test cases that provide a maximum level of software code coverage of the software code methods using the minimum number of test cases may be performed as a Set Covering Problem (SCP) with a Non-deterministic Polynomial-time hardness ("NP hard", which one of skill in the art in possession of the present disclosure will recognize includes no available polynomial time solution), which may be solved using a polynomial time Greedy approximate algorithm that provides a Log(n) approximate algorithm with the following characteristics:

Input:
    Given a universe $U=\{M_1, M_2, M_3 \ldots M_n\}$
    U is the full set of software code methods in the software code that provides the System Under Test (SUT)
    Given a set of test cases: $T=\{T_1, T_2, T_3 \ldots T_k\}$
    Each test case covers a subset of software code methods: $S_1, S_2, \ldots S_k \subseteq U$.
    Considering execution duration as the costs of each test case
    Costs=$c_1, c_2, \ldots, c_k$ Goal:
Find a set $I \subseteq \{1, 2, \ldots, m\}$ that minimizes $\Sigma_{i \in I} c_i$, such that $U_{i \in I} S_i = U$.
in the un-weighted Set Cover Problem, $c_j = 1$ for all j
Let U be the universe of elements, $\{S_1, S_2, \ldots S_m\}$ that is a collection of subsets of U, and $Cost(S_1)$, $C(S_2)$, $Cost(S_m)$ be the costs of those subsets.
1) Let I represent the set of elements included so far. Initialize I={ }
2) Do the following while I is not same as U.
   a) Find the set Si in {S1, S2, ... Sm} whose cost effectiveness is smallest, i.e., the ratio of cost C(Si) and number of newly added elements is at a minimum.
Select the set for which following value is minimum:

$Cost(Si)/|Si - I|$ b) Add elements of above selected Si to I, i.e., I=I U Si

In an embodiment utilizing an un-weighted test cases coverage problem, each test case coverage can be stored in tables in database (M are methods, T are test cases, 1 indicate that a test case covers a method, and 0 indicates a test case does not cover a method):

|  | $T_1$ | $T_2$ | ... | $T_k$ |
|---|---|---|---|---|
| $M_1$ | 1 | 0 |  | 1 |
| $M_2$ | 0 | 0 |  | 1 |
| $M_3$ | 1 | 1 |  | 1 |
| ... |  |  |  |  |
| $M_n$ | 0 | 1 |  | 0 |

Convert table to vectors $F_{T1} = (1, 0, 1 \ldots 0)$ $F_{T2} = (0, 0, 1 \ldots 1)$

...

$F_{Ti} = (1, 1, 1 \ldots 0)$

Choose $\chi$ testcases from $\{T_1, T_2, T_3 \ldots T_i\}$ that:
Minimize x, and
Maximize Coverage=$F_{T1'}$ OR $F_{T2'}$ OR ... OR $F_{Ti'}$ (amount of 1)

In a specific embodiment, greedy algorithm python code may be utilized to provide a polynomial time approximation of a set covering that chooses sets according to the rule: at each stage, choose the set that contains the largest number of uncovered elements. For example, pseudo code for such an algorithm may include the following:

```
# universe set of all methods
universe_methods = set(["m1", "m2", "m3", "m4", "m5", "m6", "m7", "m8"])
testcases = { }
testcases["1"] = set(["m1", "m2", "m4", "m7", "m8"])
testcases["2"] = set(["m4", "m6", "m8"])
testcases["3"] = set(["m2", "m7", "m8"])
testcases["4"] = set(["m1", "m4"])
testcases["5"] = set(["m1", "m6"])
final_testcases = set( )
while universe_methods:
    best_testcase = none
    methods_covered = set ( )
```

-continued

```
    for testcase, methods in testcases.items( ):
        covered = universe_methods & methods
        if len(covered) > len (methods_covered):
            best_testcase = testcase
            methods_covered = covered
    universe_methods = methods_covered
    #if cannot find out any more testcase to increase coverage, stop
    iteration if best_testcase is none:
        break
    final_testcase.add (best_testcase)
print(final_testcases)
```

As such, one of skill in the art in possession of the present disclosure will appreciate how, at block 410, the test suite optimization sub-engine 304*d* may process the test case/software code coverage mapping utilizing techniques like those discussed above to generate a test suite that includes a subset of the test cases that provide a maximum level of software code coverage of the software code methods using the minimum number of test cases. For example, the software code testing flow 500 in FIG. 5 illustrates how the test case/software code coverage mapping 512 may be utilized to provide a test suite 514. Furthermore, while specific algorithms and techniques for have been described to provide a maximum level of software code coverage during software code testing using a minimum number of test cases, one of skill in the art in possession of the present disclosure will recognize that other algorithms and techniques may be utilized to provide any desired level of software code coverage using a minimum number of test cases while remaining within the scope of the present disclosure as well.

Furthermore, while a particular ordering of the blocks 402, 404, 406, 408, and 410 of the method 400 has been described, one of skill in the art in possession of the present disclosure will recognize that the actions performed during the method 400 may be iterated to produce the test suite described above. For example, given a test case pool of test cases (in the test case database 306*a*) that have been configured to cover all the software code modules in software code that is being tested, and a user of the software code testing system 202/300 may select a first test case from that test case pool and run that test case (manually or automatically) on a software code module in order to generate a test report for that test case that is saved. As discussed above, the running of that test case will also provide a software code coverage report that will be saved as well. Furthermore, that test report and software code coverage report may then be mapped to generate a test case/software code coverage mapping that is saved as well. The user of the software code testing system 202/300 may then select a second test case from the test case pool and repeat the process discussed above, select a third test case from the test case pool and repeat the process discussed above, and so on until all of the test cases in the test case pool have been run on the software code modules. The test case/software code coverage mapping data saved for all the testing may then be utilized to identify the test suite that provides the desired level of software code coverage using a minimum number of test cases.

The method 400 then proceeds to block 412 where the software code testing system uses the test suite to test the software code modules. In an embodiment, at block 412, subsequent testing of the software code may be performed by the test case sub-engine 304*a* using the subset of test cases included in the test suite determined at block 410 in order to test each of the plurality of software code modules included in that software code, which one of skill in the art in possession of the present disclosure will recognize provide for more efficient testing of that software code by, for example, running fewer test cases while provided a desired level (e.g., a maximum level) of software code coverage for the software code methods that are included in the software code modules in that software code. As will be appreciated by one of skill in the art in possession of the present disclosure, the test suite may be utilized to test the software code as long as substantial changes are not made to that software code, and in the event substantial changes are made to the software code (e.g., in a software code update), the method 400 may be repeated to generate a new test suite for testing that updated software code in order to provide the benefits with regard to the subsequent testing of that software code discussed above. For example, a software code module may include 500 methods, and 1000 test cases may exist to "exercise" or test those 500 methods based on the test case/software code coverage mapping discussed above. In the event two of the methods in the software code module are changed, that information may be indicated, and the test case/software code coverage mapping may be utilized to identify a subset of the test cases that provide code coverage for those two methods, so those test cases may be selected and run to perform the testing.

Thus, systems and methods have been described that provide for software code testing in which a test suite of test cases may be identified for testing software code that includes a minimum number of available test cases that provide a maximum level of software code coverage for that software code. For example, a plurality of test cases may be available for testing particular software code that includes a plurality of software code modules, and each of those test cases may be run on each of the plurality of software code modules. In response to running each of the test cases on the plurality of software code modules, respective software code coverage for each software code method in each of the software code modules may be identified and mapped with the respective test case that was run on that software code module in order to provide a test case/software code coverage mapping. The test case/software code coverage mapping is then used to generate a test suite that includes a subset of the plurality of test cases that provide a maximum level of software code coverage of the software code methods included in the software code modules using a minimum number of test cases, and that test suite may be utilized for subsequent testing of that particular software code. As such, more efficient software code testing is provided that may result in maximum software code coverage using a minimum number of test cases to test that software code. Furthermore, one of skill in the art in possession of the present disclosure will appreciate that the systems and methods of the present disclosure may identify software code coverage for software code methods with a method coverage level (e.g., for system testing that is based on software code modules/feature functionality that only requires code coverage data on a method level) without statement coverage or branch coverage levels (e.g., for unit testing that tests based on a software code level and per-line/statement of code that requires code coverage data on a statement level.)

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A software code testing system, comprising:
 a test case database storing a plurality of test cases; and
 a test case sub-engine that is coupled to the test case database and that is configured to:
 run each of the plurality of test cases on a plurality of software code modules;
 a software code coverage determination sub-engine that is configured to:
 identify, based on the running of each of the plurality of test cases on the plurality of software code modules, a respective software code coverage for each at least one software code method included in each of the plurality of software code modules;
 a test case/software code coverage mapping sub-engine that is configured to:
 map the respective software code coverage for each of the at least one software code method included in each of the plurality of software code modules with the respective test case that was run on that software code module to provide a test case/software code coverage mapping; and
 a test suite optimization sub-engine that is configured to:
 characterize, as a Set Covered Problem having a Non-deterministic Polynomial-time hardness using the test case/software code coverage mapping, generation of a test suite that includes a subset of the plurality of test cases that were run on the plurality of software code modules and that provides a maximum level of software code coverage of the software code methods included in the plurality of software code modules using a minimum number of the plurality of test cases; and
 solve the Set Covered Problem having the Non-deterministic Polynomial-time hardness using a polynomial time Greedy approximate algorithm that is based on the test case/software code coverage mapping in order to generate the test suite that provides the maximum level of software code coverage of the software code methods using the minimum number of the plurality of test cases.

2. The system of claim 1, wherein the maximum level of software code coverage of the software code methods included in the plurality of software code modules provides for the testing of a maximum percentage of the software code methods included in the plurality of software code modules.

3. The system of claim 1, wherein software code coverage determination sub-engine is configured to:
 inject at least one software code coverage hook element into each of the plurality of software code modules, wherein each of the at least one software code coverage hook element is configured to identify the respective software code coverage for each at least one software code method included in each of the plurality of software code modules.

4. The system of claim 1, wherein the test case sub-engine is configured to:
 run, subsequent to the generation of the test suite, each of the subset of the plurality of test cases included in the test suite on the plurality of software code modules.

5. The system of claim 1, wherein the generating the test suite that includes the subset of the plurality of test cases includes:

identifying at least two of the plurality of test cases that are associated with software code coverage for a common software code method; and including only one of the at least two of the plurality of test cases in the subset of the plurality of test cases included in the test suite.

6. The system of claim 1, wherein the test case sub-engine is configured to:

generate a pass result or a fail result for each of the plurality of software code modules upon which a test case was run, and wherein the software code coverage determination sub-engine is configured to:

identify the respective software code coverage for each of the at least one software code method included in each of the plurality of software code modules associated with a pass result.

7. An Information Handling System (IHS), comprising:

a processing system; and a memory system that is coupled to the processing system and that includes instructions that, when executed by the processing system, cause the processing system to provide a software code testing engine that is configured to:

run each of a plurality of test cases on a plurality of software code modules;

identify, based on the running of each of the plurality of test cases on the plurality of software code modules, a respective software code coverage for each at least one software code method included in each of the plurality of software code modules;

map the respective software code coverage for each of the at least one software code method included in each of the plurality of software code modules with the respective test case that was run on that software code module to provide a test case/software code coverage mapping; and characterize, as a Set Covered Problem having a Non-deterministic Polynomial-time hardness using the test case/software code coverage mapping, generation of a test suite that includes a subset of the plurality of test cases that were run on the plurality of software code modules and that provides a maximum level of software code coverage of the software code methods included in the plurality of software code modules using a minimum number of the plurality of test cases; and solve the Set Covered Problem having the Non-deterministic Polynomial-time hardness using a polynomial time Greedy approximate algorithm that is based on the test case/software code coverage mapping in order to generate the test suite that provides the maximum level of software code coverage of the software code methods using the minimum number of the plurality of test cases.

8. The IHS of claim 7, wherein the maximum level of software code coverage of the software code methods included in the plurality of software code modules provides for the testing of a maximum percentage of the software code methods included in the plurality of software code modules.

9. The IHS of claim 7, wherein software code testing engine is configured to:

inject at least one software code coverage hook element into each of the plurality of software code modules, wherein each of the at least one software code coverage hook element is configured to identify the respective software code coverage for each at least one software code method included in each of the plurality of software code modules.

10. The IHS of claim 7, wherein the software code testing engine is configured to:

run, subsequent to the generation of the test suite, each of the subset of the plurality of test cases included in the test suite on the plurality of software code modules.

11. The IHS of claim 7, wherein the generating the test suite that includes the subset of the plurality of test cases includes:

identifying at least two of the plurality of test cases that are associated with software code coverage for a common software code method; and including only one of the at least two of the plurality of test cases in the subset of the plurality of test cases included in the test suite.

12. The IHS of claim 7, wherein the software code testing engine is configured to:

generate a pass result or a fail result for each of the plurality of software code modules upon which a test case was run; and identify the respective software code coverage for each of the at least one software code method included in each of the plurality of software code modules associated with a pass result.

13. The IHS of claim 7, wherein the software code testing engine is configured to:

identifying, via a network, the plurality of software code modules.

14. A method for testing software code, comprising:

running, by a software code testing system, each of a plurality of test cases on a plurality of software code modules;

identifying, by the software code testing system based on the running of each of the plurality of test cases on the plurality of software code modules, a respective software code coverage for each at least one software code method included in each of the plurality of software code modules;

mapping, by the software code testing system, the respective software code coverage for each of the at least one software code method included in each of the plurality of software code modules with the respective test case that was run on that software code module to provide a test case/software code coverage mapping; and characterizing, by the software code testing system as a Set Covered Problem having a Non-deterministic Polynomial-time hardness using the test case/software code coverage mapping, generation of a test suite that includes a subset of the plurality of test cases that were run on the plurality of software code modules and that provides a maximum level of software code coverage of the software code methods included in the plurality of software code modules using a minimum number of the plurality of test cases; and solving, by the software code testing system, the Set Covered Problem having the Non-deterministic Polynomial-time hardness using a polynomial time Greedy approximate algorithm that is based on the test case/software code coverage mapping in order to generate the test suite that provides the maximum level of software code coverage of the software code methods using the minimum number of the plurality of test cases.

15. The method of claim 14, wherein the maximum level of software code coverage of the software code methods included in the plurality of software code modules provides for the testing of a maximum percentage of the software code methods included in the plurality of software code modules.

16. The method of claim 14, further comprising:
injecting, by the software code testing system, at least one software code coverage hook element into each of the plurality of software code modules, wherein each of the at least one software code coverage hook element is configured to identify the respective software code coverage for each at least one software code method included in each of the plurality of software code modules.

17. The method of claim 14, further comprising:
running, by the software code testing system subsequent to the generation of the test suite, each of the subset of the plurality of test cases included in the test suite on the plurality of software code modules.

18. The method of claim 14, wherein the generating the test suite that includes the subset of the plurality of test cases includes:

identifying at least two of the plurality of test cases that are associated with software code coverage for a common software code method; and including only one of the at least two of the plurality of test cases in the subset of the plurality of test cases included in the test suite.

19. The method of claim 14, further comprising:

generating, by the software code testing system, a pass result or a fail result for each of the plurality of software code modules upon which a test case was run; and identifying, by the software code testing system, the respective software code coverage for each of the at least one software code method included in each of the plurality of software code modules associated with a pass result.

20. The method of claim 14, further comprising:

identifying, by the software code testing system via a network, the plurality of software code modules.

* * * * *